Inventors:
Wilhelm Jansen
Gustav Bollmann
By [signature]

Inventors:
Wilhelm Jansen
Gustav Bollmann
By [signature]

Inventors:
Wilhelm Jansen
Gustav Bollmann
By [signature]

Inventors:
Wilhelm Jansen
Gustav Bollmann
By
Walter Becker.

Inventors:
Wilhelm Jansen
Gustav Bollmann
By
Walter Becker

Inventors:
Wilhelm Jansen
Gustav Bollmann
By [signature]

Inventors:
Wilhelm Jansen
Gustav Bollmann
By Walter Becker

United States Patent Office 3,420,394
Patented Jan. 7, 1969

3,420,394

CONTROL DEVICE FOR A DRIVING AND STEERING TRANSMISSION FOR TRACK LAYING VEHICLES

Wilhelm Jansen and Gustav Bollmann, Bensberg-Refrath, Germany, assignors to Klockner-Humboldt-Deutz AG., Cologne-Deutz, Germany Filed June 26, 1967, Ser. No. 648,843
Claims priority, application Germany, June 29, 1966, K 59,617; Apr. 12, 1967, K 61,976
U.S. Cl. 214—776 28 Claims
Int. Cl. B62d *11/00;* B62d *57/00*

ABSTRACT OF THE DISCLOSURE

Endless track vehicle carrying a working tool in which forward and backward and turning movements of the vehicle, all under the control of a central control device rotatable to cause turning of the vehicle and reciprocable to cause forward or backward movement of the vehicle and with rotatable hand grips on the control device for controlling the movements of the working tool carried by the vehicle.

The present invention relates to a control device for a pressure medium operable clutching, reversing, and guiding transmission for track laying vehicles with a single control lever for the control of said clutching and reversing transmission while for the two guiding clutches and guiding brakes of the guiding transmission there is additionally provided a lever adapted simultaneously to control the braking of both track laying chains.

A track laying vehicle with a control device of the above mentioned type has become known, according to which the control of the clutching and reversing the transmission is effected by means of a single manual control lever while the control of the guiding clutches and guiding brakes is effected by two foot levers of which the left one is employed for bringing about a left turn whereas the right one is employed for bringing about a right turn of the track laying vehicle. This heretofore known track laying vehicle is additionally equipped with a hydraulically operable loading device having two lower lifting cylinders and two upper tilting cylinders said lifting cylinder and said tilting cylinder being controllable by one controlling device each with a manual lever. In addition thereto, the said known device is for purposes of controlling the braking mechanism for the track laying vehicle provided with a manual lever which is arranged directly adjacent the control lever for the clutching and reversing transmission.

An arrangement of the above mentioned type has the drawback that the guiding of the vehicle is effected by two additional foot levers which are arranged adjacent the foot lever that simultaneously acts upon the guiding clutches and the guiding brakes. Such foot control of a track laying vehicle is disadvantageously already due to the fact that the operator is usually accustomed to carrying out guiding operations by hand. With a faulty steering operation as is easily possible, at least considerable damage could occur. In addition thereto, the driver of such track laying vehicle is, from an operational standpoint overloaded since in addition to the control lever he also has additionally to operate the separate manual levers for the control of the loading device and the lever for controlling the speed of the driving engine. Since furthermore, the lever for controlling the speed of the driving engine is arranged adjacent the control lever, there also exists the possibility that the two levers may be mistakenly actuated, one instead of the other, whereby additional accidents may occur.

It is, therefore, an object of the present invention to provide a control device which will overcome the above mentioned drawbacks.

It is another object of this invention to provide a control device for a pressure medium operable clutching, reversing, and guiding transmission for track laying vehicles, which will considerably reduce the heretofore necessary number of manually and foot operated levers for the various controlling operations so that a relatively easy operation will be assured.

These and other objects and advantages of the invention will appear more clearly from the following specification, in connection with the accompanying drawings, in which.

Figure 1:
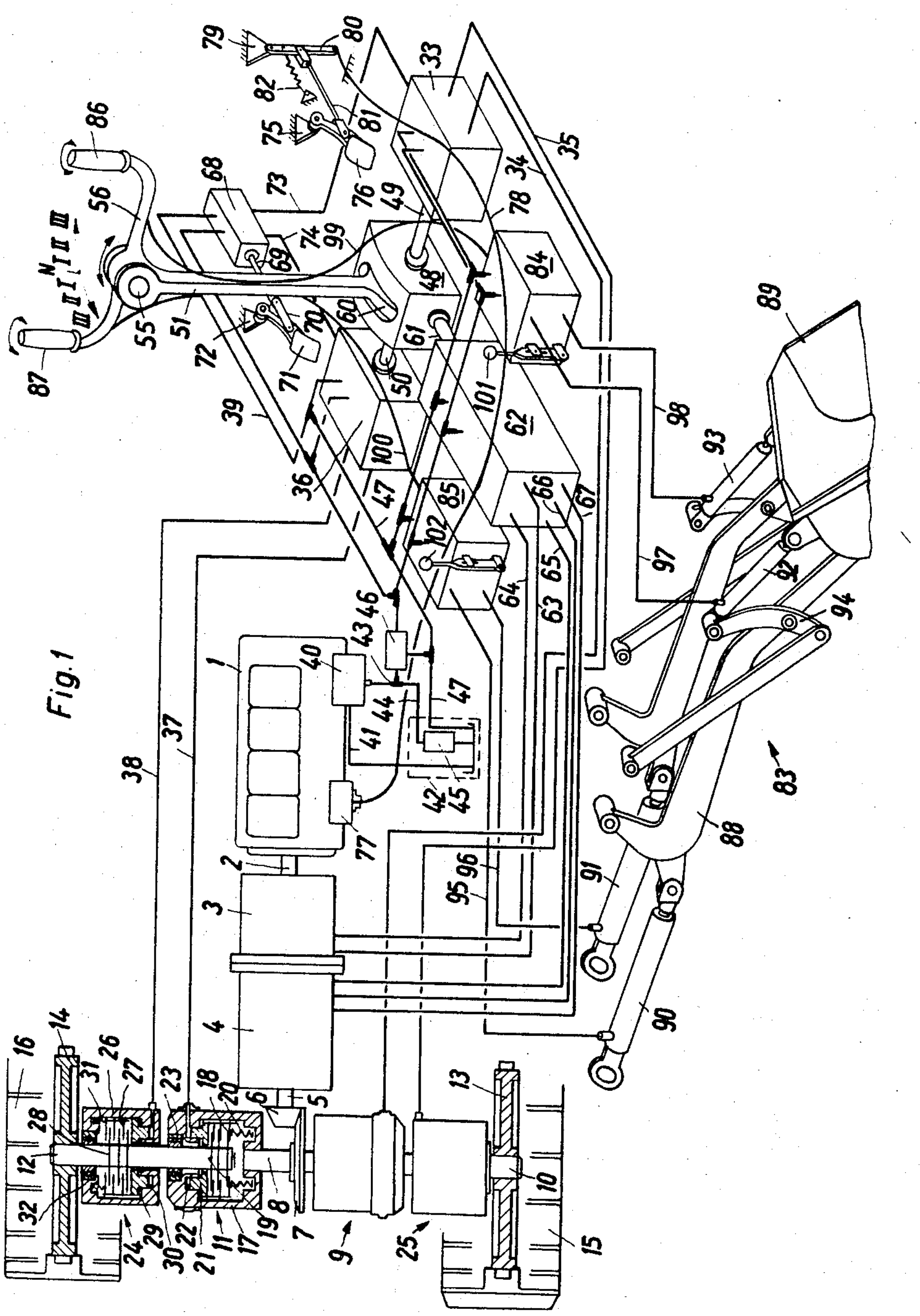
FIGURE 1 is a diagrammatical isometric illustration of the driver's stand of a track laying vehicle equipped with a loading device.

The device according to the present invention is characterized primarily in that the control of the clutching and reversing transmission is effected by pivoting a column about an axis which is perpendicular to the driving direction while the actuation of the steering brakes and steering clutches for purposes of carrying out a steering operation is effected by pivoting the column about an axis extending in the driving direction. The steering and controlling movements are adapted to be transmitted mechanically, electrically, or by a pressure medium to the respective associated fluid operable control devices.

Such an operating device has the advantage that the driver will be able by one and the same hand simultaneously to control and to steer. The solution advanced by the present invention also affords the possibility in addition to the normal foot operable braking lever which simultaneously acts as driving brake upon the steering clutches and steering brakes on both sides, to employ an ordinary foot pedal or gas pedal, or accelerator, to control the driving engine. This, in turn, creates the possibility with a track laying vehicle with loading device after interrupting the power flow for the driving, by depressing the foot operable braking lever during a shifting operation of the clutching and reversing transmission, simultaneously, for effecting a faster loading operation, to accelerate or individually to control the driving engine without the necessity of grasping or handling a plurality of handles. In this way, the safety is greatly enhanced while the loading time and thereby the economy of the track laying vehicle is considerably increased.

Instead of the above described solution, there also exists the advantageous possibility to effect the control of the clutching and reversing transmissions by pivoting a column about an axis which is perpendicular to the driving direction, and to actuate the steering brakes and steering clutches for steering by means of a device supported by the column. The steering and control operations may be transmitted to the respective pressure fluid control devices associated therewith in a mechanical, electrical, hydraulical, or pneumatic manner. Such a solution is to be preferred because it can be realized easier from a structural standpoint and furthermore facilitates the operation as will presently appear.

Another advantageous solution to the problems outlined above may be realized according to the present invention by so arranging the movable member which simultaneously serves for steering and controlling that the said movable member is displaceable in the direction of an axis and is pivotable about said axis. Such a control device has the advantage that the movable member can be so guided in the driver cab of a track laying vehicle that while a comfortable freedom of legs is assured, the operation is easy and comfortable, and a high safety factor is realized. In addition thereto, there is also obtained the advantage that the pivot axis can be located in a plane as it is customary with the steering column of a street vehicle moving on wheels while at the same time the ascending and getting out of the cab will not be interfered with by the movable member. An important advantage obtained for the driver consists in that he does not require a special training for steering the vehicle when changing from a street vehicle movable on wheels to a track laying vehicle. This is of advantage since it frequently occurs that the driver of a street vehicle, for instance of a dump truck, has to replace the driver of a track laying vehicle, for instance while the latter is sick, or on vacation.

According to a further development of the invention, the steering device on the steering column may be formed by a lever mounted in a transverse direction to the pivot plane of the steering column and on the latter.

When employing a member displaceable along an axis, and pivotable about the same for steering and controlling, it is advantageous so to design said member in the form of a rod that the latter is displaceable in its longitudinal direction and is pivotable about this longitudinal direction, for instance by means of a lever or the like. In this connection it is advantageous that the levers are nonrotatably connected to said rod and that the pivot movements of said rod are transmittable electrically, mechanically, or by a pressure medium to the associated pressure fluid control devices of the steering transmission. Such a solution offers the possibility of arranging the pressure fluid control devices of the steering transmission in a position which is favorable for the overall structure of the track laying vehicle. In addition thereto, such a solution is also suitable in particular for the structural changeover of steering drives of a track laying vehicle, which drives were heretofore operated by foot levers, or foot and hand levers, to a steering mechanism which is operable manually only.

According to an advantageous design of the invention, the lever or the movable member for the steering and control may be designed as a two-arm lever. It is advantageous in this connection to build the two-arm lever either downwardly or upwardly in a U-shape.

If, for purposes of steering and controlling, there is provided a column and a tiltable two-arm lever supported thereby, according to a further development of the invention, the two-arm lever has a tiltable pivot which is looped around by rope. The ends of said rope are connected to the control valve plungers of the pressure fluid control devices for the steering transmission.

If instead, for the steering and controlling, there is employed a displaceable and distortable rod, provided with a two-arm lever, it is advantageous to provide the rod with a follower profile having mounted thereon a two-arm lever which is axially fixed with regard to the slide guiding means. Furthermore, the ends of said lever are through the intervention of rods connected to the control plungers of the pressure fluid control devices for the steering transmission. According to an advantageous embodiment of the invention, the rod is guided in a fork-shaped support, and the two-arm lever is axially fixed by a fork-shaped portion of the support.

The transfer of the control movements of the rod onto the pressure fluid control device of the clutching and reversing transmission is advantageously effected through an intermediate lever coupled to said transmission. A locally favorable overall construction of the operating device is obtained by arranging the pressure fluid control device of the clutching and reversing transmission below the rod while said rod is by means of two-arm lever coupled to the control slide or said two-arm lever. In this connection, it is advantageous to journal the intermediate lever on the fork-shaped support. It should also be noted that the transfer of the movements of the rod to the intermediate lever is effected by means of a rotatable cross joint fixedly located on the rod. A simple overall structure is obtained by the pressure fluid control devices of the steering transmission which are arranged on both sides of the pressure fluid control device for the clutching and reversing transmission.

There also exists the possibility within the framework of the present invention to guide the rod in the pressure fluid control device for the clutching and reversing transmission, and/or the pressure fluid control device for the steering transmission. Such a solution is preferable, inasmuch as in this way with a structurally low number of parts, a special simple guiding is obtained of the element which serves for actuating the clutching, reversing and steering transmission. If the rod is guided in the pressure fluid control device of the clutching and reversing transmission, it is advantageous to design said rod as a rod slide or plunger. Assuming that with the control device, the said rod is guided in the housing of the pressure fluid control device for the clutching and reversing transmission, a simple design can be obtained by connecting the rod through a follower profile with a hollow shaft journalled in the housing of the pressure fluid control device of the steering transmission and axially fixed in said housing while the hollow shaft is equipped with cams or the like, for actuating the control plunger of the steering transmission. For purposes of employing one and the same operating device for a multiplicity of track laying vehicles, it is advantageous that the pressure fluid control device of the clutching and reversing transmission forms a single structural unit with the pressure medium control device of the steering device.

According to a further feature of the present invention, the column or the device supported thereby, or the movable member for controlling the clutching, reversing and steering transmission is provided with one or more actuating elements for controlling one or more pressure fluid operable working devices while the actuating embers are mechanically, electrically, or by a pressure fluid connected to the pressure fluid control device of the working devices. Such a solution will with a loading vehicle have the important advantage that during a control operation the vehicle can be held in its brake position while at the same time the control of the loading device is possible in addition to an individual control of the driving engine without having to turn from one handle to another handle. In this way, in addition to realizing a better possibility of the operating device, the loading times and thus the economy of the vehicle is greatly improved. If the column is equipped with a lever, or if the movable member is designed in the form of a rod provided with a lever while the lever is equipped with an actuating member for the lifting cylinder, or cylinders, and an actuating member for the dumping cylinder, or cylinders, of a working device the actuating member for the lifting cylinder, or cylinders may be arranged on one arm and the actuating member for the tilting cylinder of the loading device may be arranged on the other arm of the lever. According to a further embodiment of the invention the actuating members for the control of the pressure fluid operable working devices may be designed as turnable handles on the arms of the lever. Such a solution is advantageous inasmuch as it offers the possibility of controlling the lifting or dumping movement of a loading device proportionally to the movement of the turning handle. A particularly simple transfer of the movement of the turning handles onto the control spools of the pressure fluid control devices for the working cylinders is obtained when the control spools are connected to the turning handles by means of cable lines. In this connection it may be advantageous to design the turning handles with loop-shaped handles.

For purposes of employing the same operating device for a multiplicity of track laying vehicle types, it is provided according to the present invention that the pressure fluid control devices for the clutching and reversing transmissions, for the pressure fluid control devices for the steering trnasmission, and the pressure fluid control devices for a working implement are combined to a single unit.

It is furthermore advantageous to equip the pressure fluid control devices for the working emplement with a pre-selecting lever for selecting the basic or end position of the working implement. In this way, for instance, at the start of the operation, the most favorable digging angle and the end lifting height of the loading blade can be preselected, which in turn greatly facilitates the loading operation.

Referring now to the drawings in detail: FIG. 1 shows a track laying vehicle which comprises a driving engine 1 connected to the driving shaft 2 by means of hydraulic clutches or reversible transmissions 3 operable by brakes, said reversible transmission 3 being followed by a change-over transmission 4 controlled by hydraulic clutches or brakes. This transmission 4 in addition to having a neutral position N also has the control stages I to III. The changing gear transmission 4 has an output shaft 5 with a bevel gear 6 thereon through the intervention of which the bevel gear 7 of the intermediate shaft 8 is driven. Shaft 8 is adapted by means of a steering clutch 9 to be connected to the right-hand driving shaft section 10 and by means of a steering clutch 11 with the left-hand driving shaft section 12 of the track chain drive. The shaft sections 10 and 12 are nonrotatably connected to a driving gear 13, 14 respectively around which is looped the traction chain 15, 16 respectively for driving the same.

The clutches 9 and 11 are, in a manner known per se, designed as disc clutches. The clutch housings 17 are nonrotatably connected to the ends of the driving intermediate shaft 8. Nonrotatably arranged in the coupling housings 17 but axially displaceably guided therein are outer discs 18 which are adapted together with discs 19 by means of annularly arranged springs to be clamped or braced against each other. The said discs 19 are arranged nonrotatably but axially displaceably on the drive shaft sections 10, 12. One annular piston 21 each serves as a disengaging element for the springs 20. These pistons 21 are axially guided in an annular cylinder 22 of the clutch housings 17. The clutch housings 17 are furthermore each provided with an antifriction bearing 23 for journalling the driving shaft sections 10, 12 respectively.

Between the clutches 9, 11 on one hand and the driving gears 13, 14 there are arranged the steering brakes 24, 25, which in a manner known per se, are disc brakes. Each of said brakes comprises a stationarily supported housing 26, outer discs 27 nonrotatably, but axially displaceably guided in said housing 26 and inner discs 28, axially displaceable on the driving shaft sections 10, 12. As clamping element for the said brakes there is provided one annular piston 29, each of which is arranged in a respective annular cylinder 30 of the housings 26 and is under the load of an annularly arranged return spring 31. The housings 26 of the brakes 24, 25 have furthermore journalled therein the driving shaft sections 10, 12, and more specifically, their outer ends which are supported by antifriction bearings 32.

For purposes of controlling the coupling 9 and brake 25 associated with the right-hand driving shaft 10, there is provided a right-hand control device 33, which by means of a conduit 34 is operatively connected to the annular cylinder 22 and by means of a conduit 35 is connected to the annular cylinder 30. A corresponding left-hand control device 36 serves for controlling of coupling 11 associated with the left-hand driving shaft section 12 and the brake 24. The control device 36 is by means of a conduit 37 connected to the annular cylinder 22 of the clutch 11 and by means of a conduit 38 is connected to the annular cylinder 30 of brake 24. The control devices 33 and 36 are connected to conduit 39 for feeding the pressure fluid. This conduit 39 is supplied with a pressure medium by a pump 40 driven by the driving engine 1. Pump 40 communicates through a suction line 41 with a fluid storage container 42. Between pump 40 and the annular conduit 39 there is interposed a branch line 43 which through a conduit 44 and an interposed pressure holding valve 45 communicates with a storage container 42. Interposed between the branch point 43 and conduit 39 is a pressure relief valve 46 which has its branch line connected to a pressureless conduit 47 which connects the control devices 33 and 36 with the storage container 42.

Between the two control devices 33 and 36 there is provided a control column housing 48 which by means of spacer pipes 49 and 50 is connected to the housing portions of the control devices 33, 36. As will be evident from FIG. 2, in the housing 48 there is journalled a hollow column 51 with its hollow studs 52 and 53. Column 51 is pivotable about an axis which is substantially perpendicular to the driving direction. The upper end of column 51 has a bearing 54 which is preferably in alignment with the pivot plane of column 51. A U-shaped steering lever 56 is pivotable to a limited extent in said bearing 54 by means of a stud 55. The said lever 56 is nonrotatably connected to stud 55. The pivot movements of the lever 56 are by the bearing stud 55 and by means of a cable 58 looped around said stud 55 and prevented against slipping by means of a clamp 57, conveyed to the nonillustrated control spool of the control devices 33 and 36. The control spools of control devices 33 and 36 are connected with the ends (not illustrated) of the cable 38 and are spring biased in a preloading sense by identical springs so that an automatic return of the lever 56 to is intermediate position will be assured. In order to realize a smooth operation of the lever 56, and for purposes of protecting the cable 58, reversing rollers 59 are arranged on the two reversing portions of the cable within column 51 in the vicinity of the bearing studs 52 and 53. The said deviating rollers 59 are located tangentially with regard to the pivot axis of the bearing studs 52, 53. In this way it will be assured that a tilting of the column 51 will not result in a displacement of cable 58. FIG. 1 furthermore illustrates that the column 51 is provided with a cam-shaped segment 60 (partially shown only) which is adapted by means of a nonillustrated spring biased push-rod guided in a connecting pipe 61 to act upon the valve spool of the control device 62 which serves for controlling the reversing as well as the control transmission 3, 4. The control device 62 is, by means of a conduit 63 connected to the forward clutch and by means of a conduit 64 is connected with the rearward clutch of the change gear transmission 3. Furthermore, the control device 62 is, by means of conduit 65, 66 and 67 connected to the three control clutches of the transmission 4, said control clutches corresponding to the three control steps I–II–III.

The two conduits 39 and 47 have connected thereto the main brake control device 68, the control spool 69 of which is through a brake link system 70 coupled to a brake pedal 51 which when viewing in the driving direction is located on the left-hand adjacent the column 51. The brake pedal is pivotable on a stationary supporting member 72 in the driver's cab of the track laying vehicle.

From the main brake control device 68 which by means of a conduit 73 communicates with the control device 33 and through a conduit 74 communicates with the control device 36, when operating the brake pedal 71 in the control devices 33 and 36 simultaneously the nonillustrated control pistons and thus the control spools thereof, are proportionally acted upon by a pressure fluid medium for pivoting the brake pedal 71. This results in a movement in the same direction of the control pistons of the control devices 33 and 36 so that an actuation proportionally to the brake pedal movement will result in a suitable actuation of the annular cylinder 22 of the clutches 9 and 11 and of the annular cylinder 30 of brakes 24 and 25. The relief of the two conduits 73 and 74 which is necessary for disengaging the brakes 24, 25 and for engaging after an effected braking operation, is effected by the control spool 69 of the main braking control device 68 by connecting the latter with the exhaust conduit 47.

When looking in the driving direction, on the right-hand side adjacent the column 51 there is provided a gas pedal 70 which is journalled on a stationary support 75 in the driver's cab or at the driver's stand for controlling the driving engine 1. The transfer of the pedal movements to the governor 77 of the driving engine 1 is effected by a cable drive 76 which has that end thereof which is adjacent the pedal linked to a tiltable lever 80 which is journalled on a support 79, said lever 80 being connected through a linkage 81 with the pedal 70. In this way the lever 80 is biased in counterclockwise direction by a stationarily linked return spring 82.

In addition to the above described operating devices for the drive, the hydraulic control devices 33, 36 and 62 of which together with the control column housing 48 are arranged below the platform (not shown) of the driver's stand, the driver's stand is additionally equipped with a control device for a fluid operable loading device 83 connected to the vehicle. This control device 83 comprises two control devices 84 and 85 connected to the conduits 39 and 47, and also comprises the turnable handles 86, 87 which serve for controlling the control devices 84 and 85 and are arranged at the ends of the U-shaped steering lever 56. The loading device 83 itself comprises the lifting linkage 88, loading buckets or scoops 89 coupled to said linkage 88, the two lower lifting cylinders 90, 91 and the two tiltable cylinders 92 and 93. The two lower lifting cylinders 90, 91 are linked on one hand to stationary supports (not shown) of the vehicle and on the other hand are pivotally linked to the lifting linkage 88. The two upper tiltable cylinders 92, 93 are, however, on one hand tiltably connected to the loading buckets or scoops 89 and on the other hand to rocker arms 94 of the lifting linkage 88. The control device 85 which, when looking in the driving direction, is preferably located on the left-hand side adjacent the control device 62 is through a conduit 95 in communication with the right-hand lifting cylinder 90 and through the intervention of a conduit 96 is in communication with the left-hand lifting cylinder 91 of the loading device 83. The two tilting cylinders 92, 93 are through a conduit 97, 98 connected to the control device 84 which, when looking in the driving direction, is preferably located on the right-hand side adjacent the control device 62. The actuation of the valve spool of the control devices 84 and 85 is effected by actuation of the turnable handles 86, 87 through the intervention of cable drives 99, 100 which extend along the column 51 at both sides thereof. In addition thereto, the control devices 84 and 85 have one manually operable control lever each, namely 101 and 102 respectively, by means of which the starting or end position of the lifting or tilting cylinders can be preselected. The control devices 85, 84 are coupled through return linkage means (not shown) to the lifting linkage 88.

The operation of the control device is as follows: In the position N shown in FIG. 1, the column 51 together with the steering lever 56 occupies the neutral position. This brings about that while the driving engine 1 is running, the clutches of the reversible transmission 3 and of the shiftable transmission 4 as well as the cylinders 30 and 22 of the clutches 11, 9 or the guiding brakes 25, 24 are under no pressure. The power supply between the driving engine 1 and the driving gears 13 and 14 is thus interrupted.

If from the above described neutral position the column 51 is by means of lever 56 shifted into the control stage I while the driving engine 1 is running, the control spool of the control device 62, which by means of the cam-shaped segment 60 is thus shifted into control stage I, will connect the conduit 39 through conduit 63 with the forward clutch of the reversible transmission 3 and through conduit 65 with the control stage I of the shiftable transmission 4. If in this connection the neutral position of the lever 56 is maintained, the cylinders 22 of the clutches 9 and 11 will receive no pressure medium so that the said clutches will due to their spring sets 20 remain engaged and the vehicle will in control stage I be driven straight forward. When shifting over from the control stage I to the control stage II or III by further turning the column 51 in clockwise direction, it will be evident that in view of the control spool 62 a shift-over of the conduit 39 from conduit 65 to conduit 66, 67 and simultaneously a relief of the respective disengaged conduits 65, 66 will be effected through the conduit 47. Consequently, the vehicle will now move in the forward stages II or III.

The control of the rearward control stages I to III is effected by turning the control column 51 from its neutral position in counterclockwise direction while in the individual rearward movement stages, in contrast to the forward movement stage, instead of the forward clutch of the transmission 3 the rearward clutch of said transmis ion 3 is through the control device 62 via conduit 64 connected to the conduit 39 whereas the conduit 63 is relieved through conduit 47. The guiding of the vehicle in the forward as well as in the rearward stages of the drive is effected for the right turn by turning the steering lever 56 in clockwise direction. The turning of the lever 56 in clockwise direction by a fraction of its total possible movement will result in a displacement of the control spool of the right-hand control device 33 whereby the conduit 39 will communicate with the conduit 34 so that the cylinder 22 of the clutch 9 will receive pressure fluid. This in turn brings about an interruption of the power flow between the intermediate shaft 8 and the right-hand driving shaft 10. In this way, if a great rolling resistance of the track chain 15 is encountered, already a right turn of the vehicle may be effected. When from the above mentioned turning position the steering lever 56 is turned further in clockwise direction, in view of the proportional displacement of the control spool of the control device 33 a continuously increasing admission of pressure fluid to the cylinder 30 of the right-hand brake 25 will occur. As a result thereof, depending on the turning angle of the lever 56, a corresponding right turn of the vehicle will be obtained. When turning the steering lever 56 from the above mentioned turned position back to its neutral position, in successive order, the cylinder 30 of the right-hand guiding brake 30 and the cylinder 22 of the right-hand guiding clutch 9 are by means of the control spool of the control device 33 relieved through conduit 47.

A turning of lever 56 from its neutral position in counterclockwise direction will in the same manner as described above for the right turn of the vehicle bring about a corresponding actuation of the clutch 11 and of the brake 24 and thereby a left turn of the vehicle.

If in the above mentioned conditions of operation at the same time or therebetween a loading or unloading operation is to be effected by means of the loading device 83, this is done in the following manner.

Assuming that the loading buckets or scoops 89 are in transporting position in which they are lifted off the ground to a certain extent by turning the left-hand turnable handles 87 in counterclockwise direction and the resulting proportional displacement of the control device 85, a relief of the conduits 95 and 96 and thereby of the lifting cylinders 90 and 91 is initiated whereby the loading buckets 89 are lowered to an extent which can be preset by the lever 102. Assuming that the loading bucket in this position does not occupy the most favorable digging angle, it is possible by turning the right-hand turning handle 86 in clockwise or counterclockwise direction to correct the digging angle. Depending on the turning of the turning handle, the control device 84 will bring about a filling or emptying of the tilting cylinders 92 and 93 which brings about a corresponding tilting of the loading bucket 89 up to the extent preset by the lever 101. Thereupon, by means of the vehicle, the loading bucket is filled by driving into the goods to be loaded, and after the loading bucket has been filled, the latter will by turning the handle 87 in clockwise direction be lifted by means of lifting cylinders 90 and 91 onto the pouring level. During this lifting operation of the loading device, the driver has the possibility to move the vehicle with loaded bucket to a transporting vehicle in the vicinity so that it will occupy the most favorable tilting position for the loading bucket so that the shortest working cycle will be obtained. After the most favorable tilting level and working range of the bucket have been obtained, the handle 86 is turned in counterclockwise direction for tilting the loading buckets 89.

During the tilting operation, the driver has at the same time the possibility to shift from a previously selected forward control stage to a correspondingly selected rearward control stage while the brake pedal 71 is depressed. After the tilting operation has been completed, it is merely necessary for the vehicle operator to release the brake pedal 71 and to depress the gas pedal 76 so that the vehicle in conformity with the effected steering position of lever 56 moves again to the rear to the loading place.

As will be evident from the above, the operating device according to the present invention permits the operator to carry out a multiplicity of control operations without the necessity of changing over from one handle to another handle. In this way, as far as the control, steering and loading operations are concerned, the operator will be able to carry out a highly favorable manipulation which does not strain the operator.

Figure 2:
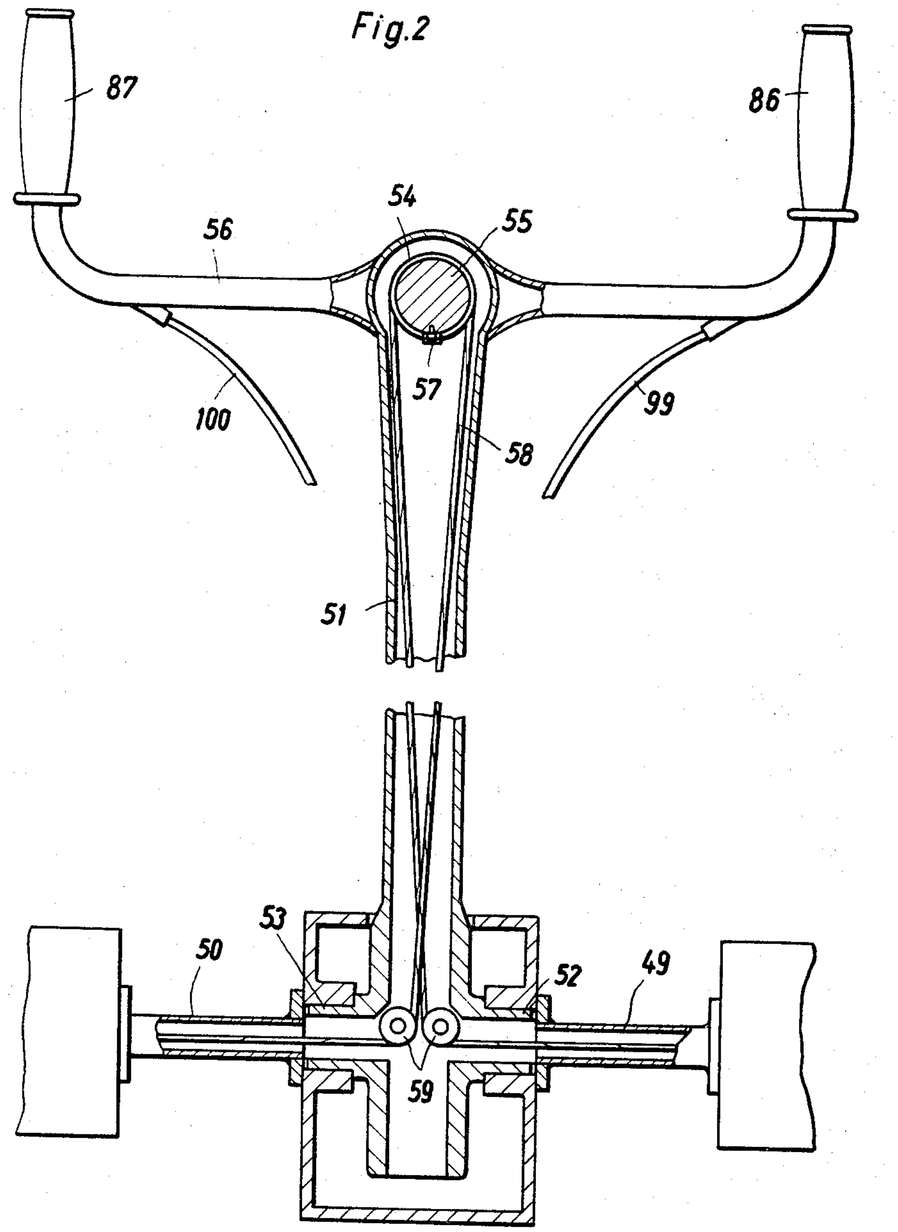
FIGURE 2 is a longitudinal section on an enlarged scale through the column of the driver's stand according to FIG. 1.
Figure 3:
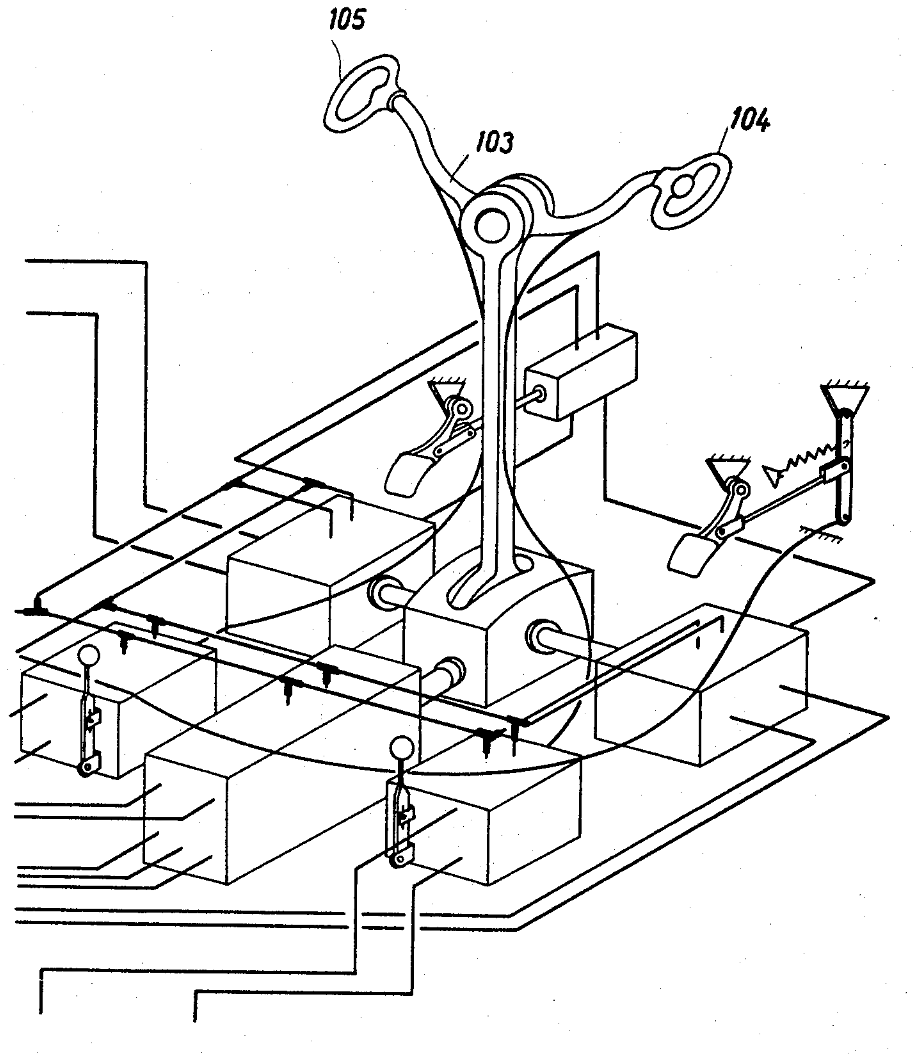
FIGURE 3 is a modification of the guiding member of the control device according to the invention.

FIG. 3 represents a modification of the arrangement shown in FIGS. 1 and 2. More specifically, according to FIG. 3, the steering lever 103 has both ends thereof provided with a loop-shaped turnable handle 104, 105 respectively the tilting axis of which extends approximately transverse to the tilting plane of the column 51. The turning movements of the handles 104 and 105 are through the above described cable drives 99, 100 conveyed to the control devices 84, 85 for the loading device 83 so that the same effect is obtained as with the upwardly directed turning handles 86 and 87 in conformity with FIGS. 1 and 2. It should also be mentioned that with regard to the shaping of the steering lever 56, a plurality of possibilities exists without requiring a change in the operation. Thus, for instance, the steering lever may be in the form of half a steering wheel which is expedient for certain vehicles. Furthermore, there also exists the possibility of designing the steering lever 56 in the form of a straight bar and to arrange the handles in the axial direction of the bar.

Within the frame work of the present invention, the column 56 itself may serve as steering lever to which end a tilting of said lever in a direction transverse to the control direction brings about a displacement of the control spool in the control devices 33 and 36 and thereby an actuation of the clutches 9, 11 and brakes 24, 25.

Figure 4:
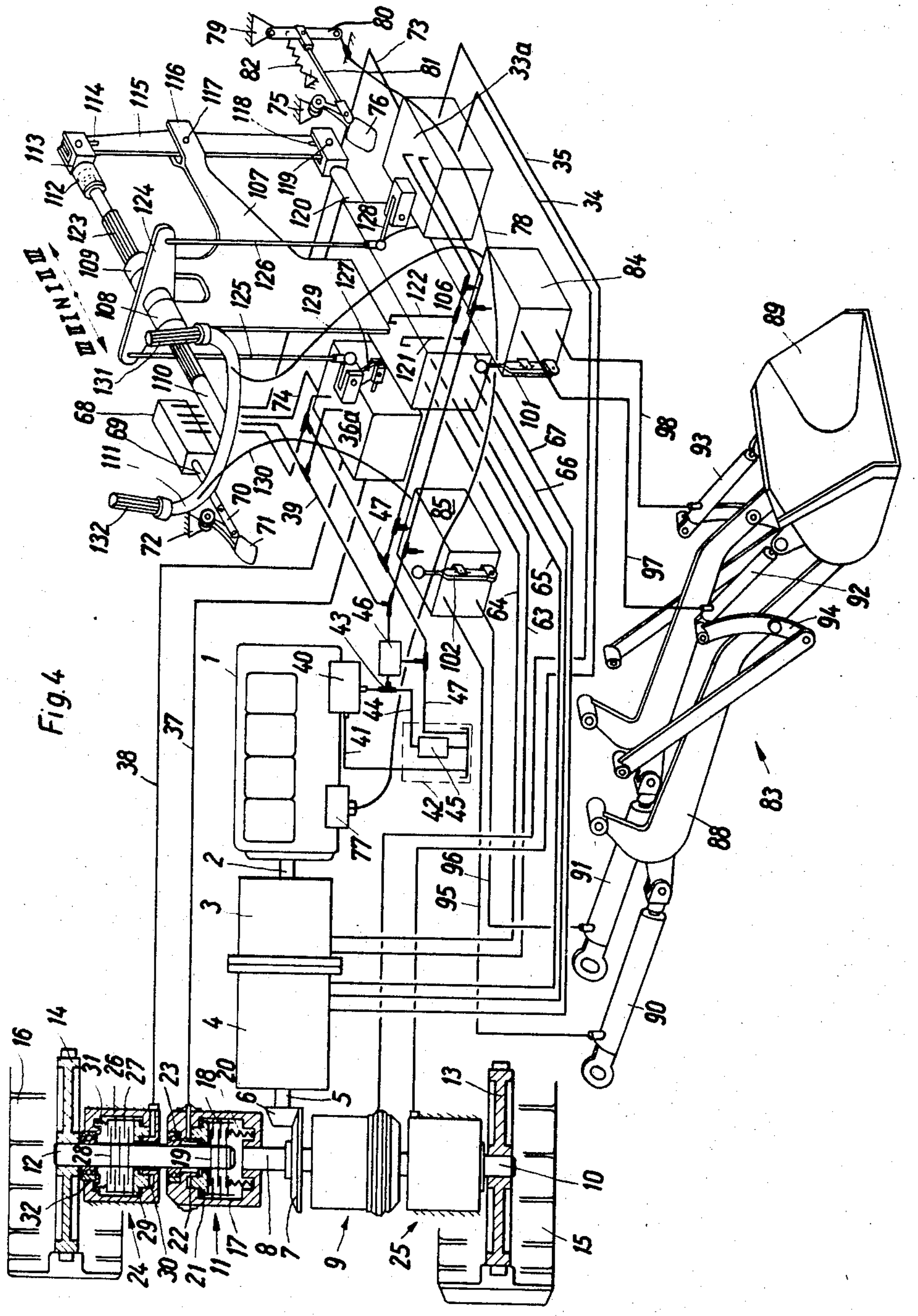
FIGURE 4 is a diagrammatic isometric illustration of the driver's stand of a control device equipped with a displaceable and pivotal guiding and control member.

FIG. 4 shows a further modification of the arrangement of FIG. 1. More specifically, according to FIG. 4, between the two fluid pressure control devices 33a and 36a there is arranged a pressure fluid control device 106 for controlling the clutch actuating transmission 4 and the reversible transmission 3. Mounted on the pressure fluid control device 106 is a fork-shaped support 107 which supports two axially aligned axial bearings 108 and 109 having displaceably and tiltably guided therein a rod 110. The axis of rod 110 is advantageously located in an axis which is approximately parallel to the longitudinal central axis of the track laying vehicle. The rod 110 has that end which faces the driver's seat (not shown) provided with a steering and control member 111 non-rotatably connected to said rod 110 and having a U-shape. When the steering lever 111 is displaced in the longitudinal direction of the vehicle, these movements are by means of rod 110 through the intervention of a cross joint 113 which by means of a flange 112 is nonaxially displaceable on said rod 110 but is rotatably journalled thereon transferred to a two-arm intermediate lever 115 which is provided with an oblong opening 114. This intermediate lever 115 is by means of a bolt 117 mounted in a portion forming a fork 116 and pertaining to the support 107. From the intermediate lever 115 through the free end of the latter which is likewise provided with an oblong opening 118, the transfer of the control movements of rod 110 is effected through a bolt 119 to the control spool 120 of the pressure fluid control device 106. The pressure fluid control device 106 transfers the control movements of the control spool 120 hydraulically through a conduit 63 to the forward clutch and through the conduit 64 to the rearward clutch of the reversible transmission 3. Furthermore, the pressure fluid control device 106 is by means of conduits 65, 66 and 67 connected to the three control clutches of the clutch control transmission 4 which correspond to the control stages I–II–III. In addition to the above, the control device 106 is through conduits 121 and 122 connected to the conduit 39, 47.

From the steering lever 110 the turning movements for turning the steering transmission are through the intervention of rod 110 which is provided with a follower profile 123 transmitted to a lever 124 which is located between the two bearings 108, 109 of the support 107 and is axially nondisplaceable. By means of the two-arm lever 124 the steering movements are transferred through the ends of lever 124 which are coupled to a rod 125, 126 respectively and through intermediate levers 127, 128 onto the control spool of the pressure medium control devices 33a, 36a respectively. The two fluid pressure control devices 33a and 36a are similar to the fluid pressure control devices 33 and 36 of FIG. 1 influenced by a main brake control device 68 which is arranged on the left-hand side adjacent the support 107.

When looking in driving direction, on the right-hand side adjacent the column 107, similar to the manner described in connection with FIG. 1, there is provided the gas pedal 76 for controlling the governor 77 of the driving engine 1.

In addition to the above described control devices according to FIG. 4, the pressure fluid control devices 33a, 36a and 106 are preferably below a platform (not shown) of the driver's stand, the driver's stand has a control device for the loading device 83 the details of which have likewise been described in connection with FIG. 1. The control device for the loading device 83 comprises the pressure fluid operable control devices 84 and 85 described in connection with FIG. 1. The control spools of the devices 84 and 85 are actuated through cable drives 129, 130 by means of turnable handles 131, 132 arranged on the steering lever 111. The cable drives 129 and 130 are guided partially in U-shaped steering lever 111. In addition thereto, the pressure fluid operable control devices 84 and 81 are equipped with manually operable control levers 101 and 102 likewise described in connection with FIG. 1, by means of which the starting or end position of the lifting or tilting cylinders may be effected. The control devices 84 and 85 are similar to the control device of FIG. 1 connected by return linkage means or the like (not illustrated) with the lifting linkage 88.

The operation of the pressure fluid control devices 33*a*, 36*a*, 106 and of the pressure fluid control devices 84 and 85 is the same as that described in connection with FIG. 1. The pressure fluid control device 106 corresponds as far as its operation is concerned to that of the pressure fluid control device 62 of FIG. 1. The control of the devices 33*a* and 36*a* is, as has been described in connection with FIG. 1, effected by means of pivoting the lever 111 in a plane approximately transverse to the driving direction, whereas the shifting movements are effected by displacing the rod 110 by means of the steering lever 111. In view of the turning movements of handles 131 and 132, as has been described in connection with FIG. 1 and handles 86 and 87, a control of the loading device 83 is effected.

Figure 5:
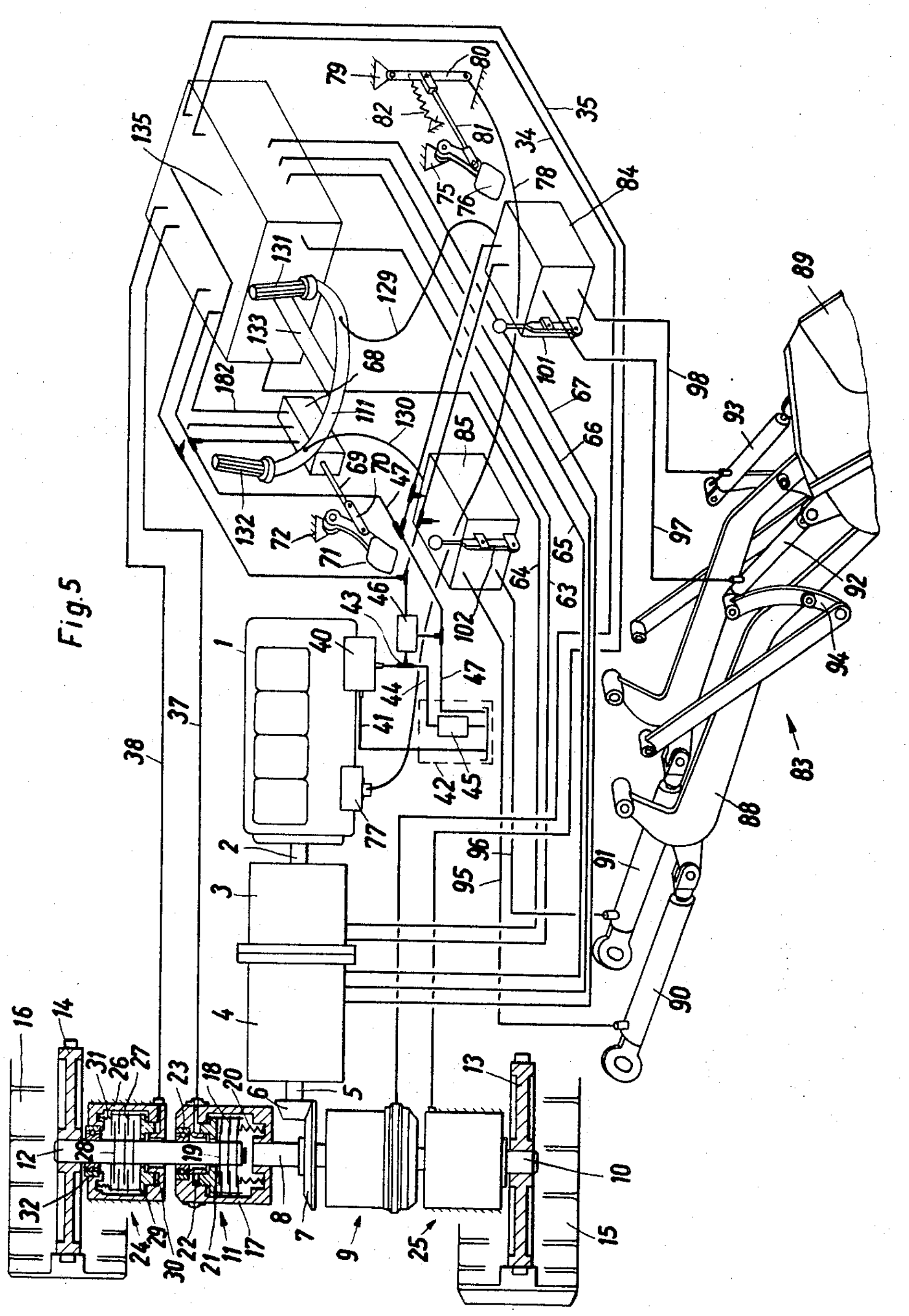
FIGURE 5 represents a modification over the arrangement of FIG. 4.
Figure 6:
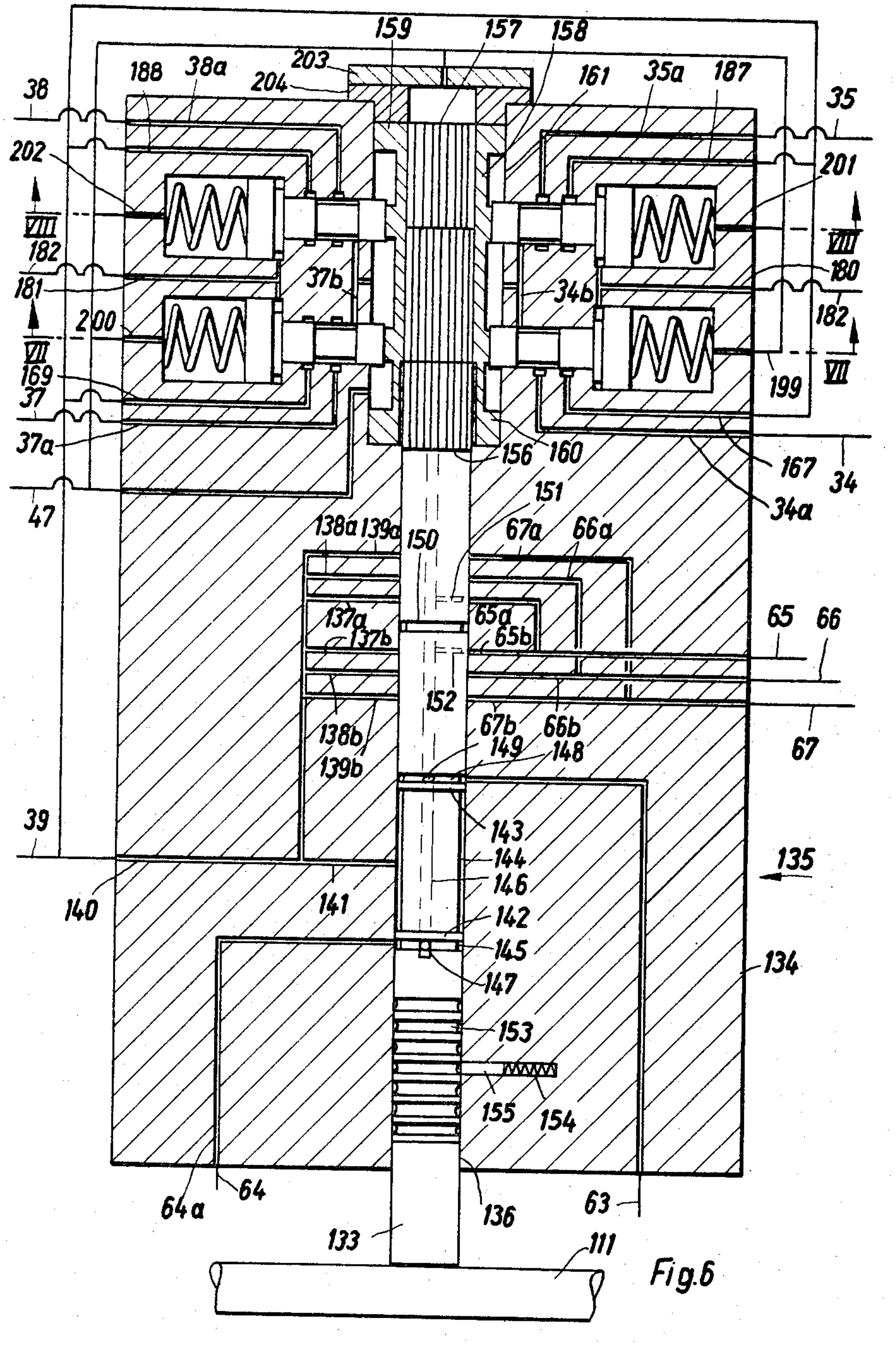
FIGURE 6 represents a horizontal section through the fluid pressure control device of the control mechanism of FIG. 5 for the clutching, reversing, and guiding transmission.

In a modification shown in FIGS. 5 and 6 over that of FIG. 4, the rod 133 serving for shifting and controlling is guided in the housing 134 of the device 135 of the clutch shifting, reversible and steering transmission and, more specifically, is guided in a control bore 136 while being designed as a control spool. Connected to the control bore 136 are the control conduits 63 and 64 for the reversible transmission 3. This connection is effected through passages 63*a*, 64*a* respectively. Similarly, the control conduits 65, 66 and 67 are through passages 65*a*/*b*, 66*a*/*b* and 67*a*/*b* connected to the control bore 136. Oppositely located with regard to the passages 65*a*/*b*, 66*a*/*b* and 67*a*/*b* and leading into the control bore 136 there are passages 137*a*/*b*, 138*a*/*b* and 139*a*/*b*. These last mentioned passages are connected to a branch line 140 for admitting pressure fluid from the conduit 39.

Into the control bore 136 between the two passages 63*a* and 67*a* there leads a passage 141 which communicates with the branch line 140. For controlling the pressure fluid admission from the passage 141 to the passages 63*a* and 64*a* there is provided a control spool 133 with control collars 142 and 143. These spools 133 have their end faces close a chamber 144 which is formed by the control spool 133 and control bore 136. By means of said chamber 144, when displacing the control spool 133 from its neutral position into forward driving direction, the passage 141 will be connected with the passage 63*a*, whereas when the control spool 133 is displaced from its neutral position into rearward driving direction, the passage 141 will be connected to the passage 64*a*. The control collar 142, by means of its end face facing the lever 111, forms an annular groove 145 which in neutral position is in communication with the passage 64*a* and through a central bore 146 in control spool 133 is in communication with the conduit 47. The transfer of the pressure fluid from the annular chamber 145 to the bore 146 is effected through a transverse bore 147 in the control spool 133. The control collar 143 blocks with regard to the chamber 144 a chamber 148 which in neutral position establishes communication between the passage 63*a* and the pressureless bore 146 through a transverse bore 149.

The control spool 133 is between the two passages 65*a*/*b* provided with a control groove 150 through which in the forward stage I the passage 137*a* communicates with the passage 65*a* whereas in the forward stage II the passage 138*a* communicates with the passage 66*a*, while finally in the forward stage III the passage 139*a* communicates with the passage 67*a*. Correspondingly, in the rearward driving stages I, II and III the control groove 150 establishes communication between the passage 137*b* and passage 65*b*, and furthermore the passage 138*b* is connected to the passage 66*b* while finally the passage 139*b* is in communication with the passage 67*b*. Furthermore, the control spool 133 on both sides of the control groove 150 is provided with one transverse bore each 151 and 152 through which the respective shiftable clutches of the clutch shifting transmission 4 which are not subjected to pressure fluid are connected through the central bore 146 with the pressureless conduit 47. The control spool 133 additionally has that end which faces the lever 111, inside the housing 134, provided with annular grooves 153 which are, in conformity with the respective shifting positions, engaged by a pin 155 biased by a spring 154, more specifically, the engaging surface of said pin 155 is crowned while said pin serves for axially arresting spool 133.

Figure 8:
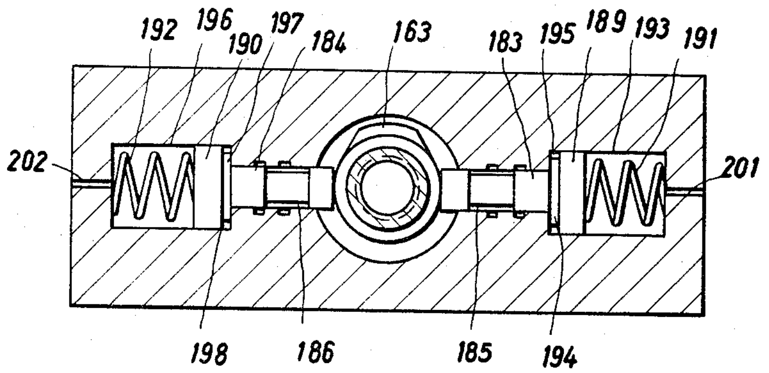
FIGURE 8 is a cross section through the pressure fluid control device of FIG. 6, said section being taken along the line VIII—VIII of FIG. 6.
Figure 7:
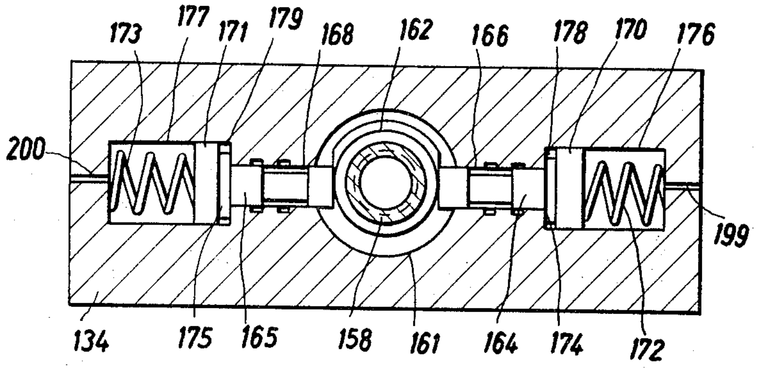
FIGURE 7 is a cross section through the fluid pressure control device, said section being taken along the line VII—VII of FIG. 6.

In addition thereto, the control spool 133 has that end thereof which faces away from the lever 111 provided with a follower profile 156 which engages the follower profile 157 of a hollow shaft 158. This shaft is provided with collars 159 and 160 by means of which said shaft is journalled in a bore 161 of the housing 134. As will be evident from FIGURES 7 and 8 in particular, the hollow shaft 158 is provided with control cams 162 and 163. The control cam 162 serves for actuating a control spool 164 for the control of the steering clutch 9 and for actuating a control spool 165 for controlling the steering clutch 11. The control spool 164 is guided in a control bore 166 which through the intervention of a passage 167 communicates with the conduit 34. Correspondingly, the control spool 165 is guided in a control bore 186 which through a passage 169 is connected to the conduit 39 and through a passage 37*a* communicates with the conduit 37. Depending on the direction of rotation of the control cam 162, the control spools 164 and 165 will establish communication between the passage 167 and conduit 34 and between the passage 169 and the conduit 37 respectively, whereby the clutch 9 or clutch 11 is actuated. In the illustrated neutral position, the passage 34*a* and the passage 37*a* are through a passage 34*b*, 37*b* connected to a pressureless bore 161 whereby the cylinders 22 of the clutches 9 and 11 are relieved through the pressureless conduit 47. The control spool 164 similar to the control spool 165 is provided with a piston 170, 171 which are biased by a spring 172, 173 respectively in the direction of the control cam 162. The pistons 170 and 171 form with a collar 174, 175 and the guiding bores 176, 177 one annular chamber 178, 179 each which chambers through passages 180, 181 communicate with the conduit 182 leading to the main brake valve 68.

By means of control spool 163, depending on its direction of rotation, a control spool 183, 184 is actuated with a delay relative to the control spools 164, 165, said spools 183, 184 being guided in a control bore 185, 186 respectively. Connected to the control bore 185 through a passage 35*a* is a conduit 35 whereas the conduit 39 communicates through a passage 187 with the control bore 185. Correspondingly, the control bore 186 communicates through a passage 38*a* with a conduit 38, whereas the conduit 39 communicates through a passage 188 with the control bore 186. In the neutral position of the control spool 133, the passages 35*a* and 38*a* are relieved through the passages 34*b* and 37*b* and the pressureless bore 161. The control spools 183 and 184 are furthermore provided with a piston 189, 190 having a larger diameter, which pistons are biased by a spring 191, 192 in the direction of the control cam 163. The piston 189 forms with its guiding bore 193 and its collar 194 an annular chamber 195 which communicates with the passage 185, whereas the piston 190 with its guiding bore 196 and collar 197 forms an annular chamber 198 communicating with the passage 181. The chambers serving for receiving the springs 172, 173, 191 and 192 are through passages 199, 200, 201 and 202 connected to the pressureless conduit 47.

The connection of conduit 47 with the above mentioned pressureless bore 146 is effected by a cover 203 which is clamped to the housing 134 by means of a flange 204 for axially fixing the hollow shaft 158.

*Operation of the device according to FIGS. 5–8*

When in the above described neutral position of the steering lever 111 by means of the latter the control spool 133 is moved into its forward drive stage I, the passage 141 is through the chamber 144 placed into communication with the conduit 63, and the forward drive clutch connected to the conduit 63 and pertaining to the change gear transmission 3 is engaged. At the same time, due to the control groove 150, the passage 137*a* is placed into communication with the passage 65*a* which latter through conduit 65 of the shiftable clutch for the stage I of the shiftable transmission conveys pressure fluid, thereby engaging said last mentioned clutch. When shifting from stage I to stage II or stage III by displacing the control spool 133 further, the latter will, while the connection between passage 141 and conduit 163 is maintained, establish a connection of the passage 138 with the passage 66*a* and a connection of the passage 139*a* with the passage 67*a*. When shifting from stage I to stage II or III, the transverse bore 151 communicating with the conduit 47 will relieve the respective passage 65*a*, 66*a* which was previously subjected to pressure fluid.

The vehicle will in conformity with the respective forward stages I–III drive forwardly.

The control of the rearward stages I–III is effected by displacing the control spool 133 by means of the lever 111 in the driving direction toward the rear. In the individual rearward drive stages, in contrast to the forward drive stages, the passage 141 comes into communication with passage 64*a* so that the conduit 64 for the rearward clutch of the change gear transmission 3 is supplied with pressure fluid. Accordingly, in the individual rearward drive stages I–III, the passages 137*b* communicate with the passage 65*b* while the passage 138*b* communicates with the passage 66*b* and the passage 139*b* communicates with the passage 67*b* through the control groove 150. The relief of the respective disengaged shiftable clutches of the shifting transmission is effected through the intervention of the transverse bore 152 which communicates with the pressureless conduit 47. When shifting from the neutral position to one of the rearward drive stages, furthermore, the passage 36*a* communicating with the rearward clutch is relieved through the annular groove 148 to conduit 47.

The steering of the vehicle in the forward and the rearward stages of the drive is for a right turn effected by pivoting the lever 111 in clockwise direction. The pivoting of the lever 11 in clockwise direction about a portion of the possible angle brings about first a displacement of the control piston 164 which establishes a communication between the passage 34*a* and the passage 167. As a result thereof, the cylinder 22 of clutch 9 receives pressure fluid. This in turn interrupts the power flow between the central shaft 8 and the right-hand driving shaft 10. When a considerable roller resistance of the track chain 15 is encountered, this may already bring about a right turn of the vehicle. When from the above described pivoting position, the lever 111 is further turned in clockwise direction, due to the control cam 163 subsequently a continuous displacement of the control valve 183 is effected whereby the conduit 39 is through the passages 187, 35*a* brought into communication with the cylinder 30 of the right-hand steering brake 25. By means of a continuous further displacement of the control spool 183, as brought about by the control cam 163, a corresponding right turn movement of the vehicle is effected in conformity with the pivotal angle of the lever 111. When pivoting back the lever 111 from the above described pivoting positions to its neutral position, successively, the cylinder 30 of the righthand brake 25 and the cylinder 22 of the right-hand clutch 9 and by means of the control spool 163, 164 is relieved through conduit 47.

A pivoting of lever 111 from its neutral position in counterclockwise direction will in the same manner as described for the right turn movement of the vehicle bring about a corresponding actuation of the clutch 11 and of the brake 24 and thereby will bring about a left turn movement of the vehicle.

If in the above described conditions of operation it is desired that at the same time all steering clutches and steering brakes are to be actuated, this is possible by displacing the foot pedal 71 whereby from the main control device 68 the conduit 182 which communicates with the chambers 178, 179, 195 and 198, is supplied with pressure fluid while at the same time through the control spools 164, 165, 183 and 184, the simultaneous supply of the cylinders of the steering clutches and steering brakes is effected.

The actuation of the loading device according to FIG. 5 is effected by means of turnable handles 131, 132 in the same manner as described above in connection with FIG. 1 for the handles 86 and 87.

It is, of course, to be understood that the present invention is, by no means, limited to the particular embodiments illustrated in the drawings, but also comprises any modifications within the scope of the appended claims.

What is claimed is:

1. A control arrangement for a vehicle having an operator's station and having a frame and first and second laterally spaced endless tracks thereon with first and second drive members for the respective tracks and an engine with a reversible transmission having an input member connected to the engine and an output member for connection to said drive members, said vehicle having first and second normally disengaged steering brakes connected between said frame and said first and second drive members respectively, and first and second normally engaged steering clutches connected between said output member and said first and second drive members respectively, first and second actuating means for said first and second brakes respectively energizable for engaging the brakes and first and second actuating means for said first and second clutches respectively energizable for disengaging said clutches, selector means for said transmission adjustable for selecting the speed and direction of rotation of said output member; said control arrangement being located at said operator's station and being operable for controlling said actuating means and said selector means and comprising control element means rotatable about an axis extending in the fore and aft direction of the vehicle and also moveable bodily in the said fore and aft direction, first means operatively connecting said control element means with said actuating means and responsive solely to rotation of said control element means in a respective direction from a neutral position thereof for energizing said first and second actuating means respectively, and second means connecting said control element means with said selector means and responsive solely to bodily movement of said control element means in the fore and aft direction for adjusting said selector means to select the speed and direction of the vehicle.

2. A control arrangement according to claim 1 in which said first means comprises first and second control valves for said first and second clutches and brakes respectively, and said second means comprises a further control valve disposed between said first and second control valves.

3. A control arrangement according to claim 1 in which said control element means comprises a first control member rotatable on said fore and aft axis and connected to said first means, and a second control member tiltable in the frame about a transverse axis and supporting said first control member and connected to said second means.

4. A control arrangement according to claim 3 in which said first control member is in the form of a first lever pivoted to the upper end of said second control member, and said second control member is in the form of a second lever pivoted at its lower end to said frame.

5. A control arrangement according to claim 4 in which said first lever is an arm lever and is pivoted in about the middle to said second lever.

6. A control arrangement according to claim 5 in which said two arm lever has a bar-like central portion and end portions extending angularly to said central portion so as to be readily hand graspable.

7. A control arrangement according to claim 6 in which said two arm lever comprises a drum element fixed thereto in the middle, said first means comprising valves having moveable valve members, and cable means leading from said valve members to said drum for moving the valve members when the drum turns due to rotation of said two arm lever.

8. A control arrangement according to claim 1 in which said control element means comprises a first control member rotatable on said fore and aft axis and connected to said first means, and a second control member reciprocable in said frame and supporting said first control member and connected to said second means.

9. A control arrangement according to claim 8 in which said second control member is a shaft and said first control member is a two arm lever on one end of the shaft.

10. A control arrangement according to claim 9 in which said two arm lever is fixed to the shaft so the shaft will rotate with the lever.

11. A control arrangement according to claim 10 in which said two arm lever has a bar-like central portion and end portions extending angularly to said central portion so as to be readily hand graspable.

12. A control arrangement according to claim 10 in which a second two arm lever is slidably keyed to said shaft and is held against fore and aft movement in said frame whereby the second two arm lever can be rotated by rotation of the first mentioned two arm lever but will not move when said shaft moves axially, said first means including control valves having moveable valve members connected to said second two arm lever.

13. A control arrangement according to claim 12 in which said frame comprises a stationary support member slidably supporting said shaft and engaging the opposite axial sides of said second two arm lever.

14. A control arrangement according to claim 12 in which said second means includes a control valve having a moveable valve member, and a control lever pivoted in said frame and pivotally connected to said valve member, and means rotatable on said shaft but non-axially moveable thereon and also pivoted to said control lever.

15. A control arrangement according to claim 14 in which said control valve is beneath said shaft.

16. A control arrangement according to claim 15 in which said control lever is pivoted to said stationary support.

17. A control arrangement according to claim 10 in which said second control means includes a control valve having a reciprocable valve member, and said shaft extends directly into said control valve into engagement with said valve member.

18. A control arrangement according to claim 10 in which said first and second control means include control valves having moveable valve members and valve body means, and said shaft extending directly into said body means into operative engagement with said valve members.

19. A control arrangement according to claim 18 in which the valve members pertaining to said second means are formed directly on said shaft within said body means.

20. A control arrangement according to claim 18 which includes a cam member rotatable but nonaxially moveable in said body means, said shaft being slidably keyed to said cam member, said valve members pertaining to said first means being moveably mounted in said body and being engaged by respective cam regions on said cam member.

21. A control arrangement according to claim 18 in which said body means is a single body common to all the said control valves.

22. A control arrangement according to claim 1 in which said control element means comprises hand graspable members thereon for manipulation of said control element means, said hand graspable regions being selectively moveable relative to said control element means, said vehicle comprising a moveable working device thereon having actuators, and third means connecting said hand graspable regions with said actuation responsive solely to movement of the hand graspable members relative to said control element means for energizing said actuators.

23. A control arrangement according to claim 22 in which said device is moveable in two senses and the respective actuators for effecting said movements are connected to respective ones of said hand graspable members.

24. A control arrangement according to claim 22 in which said hand graspable members comprise loops in which the vehicle operator's hands are received.

25. A control arrangement according to claim 22 in which said hand graspable members are rotatable on said control element means.

26. A control arrangement according to claim 25 in which said third means includes control valves having moveable valve members and Bowden wire devices connecting said valve members to said hand graspable members.

27. A control arrangement according to claim 26 in which said first and second means also comprise control valves and all of the control valves of said first and second and third control means are combined in a single structural unit.

28. A control arrangement according to claim 26 which includes a presettable limit valve in circuit with at least one of said control valves for limiting the movement of the working device in at least one direction.

References Cited

UNITED STATES PATENTS

| | | | |
|---|---|---|---|
| 1,677,878 | 7/1928 | Leake | 180—6.7 |
| 2,975,851 | 3/1961 | Youmans et al. | 180—6.2 |
| 3,319,817 | 5/1967 | Juhl et al. | 214—778 |

BENJAMIN HERSH, *Primary Examiner.*

J. A. PEKAR, *Assistant Examiner.*